Jan. 1, 1929. 1,697,548
F. C. WEICHELT ET AL
APPARATUS FOR USE IN MANUFACTURING LEATHER STIFFENERS
FOR THE HEELS AND TOES OF BOOTS AND SHOES
Filed Dec. 16, 1925  2 Sheets-Sheet 1
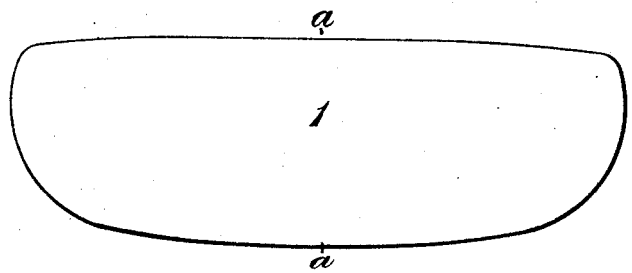
Fig.1.
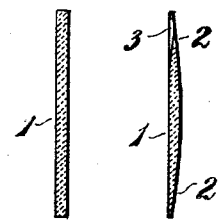
Fig.2. Fig.4.
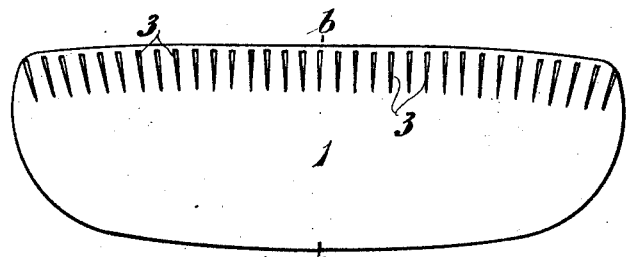
Fig.3.
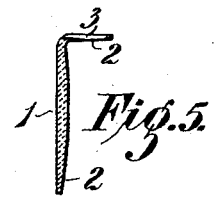
Fig.5.
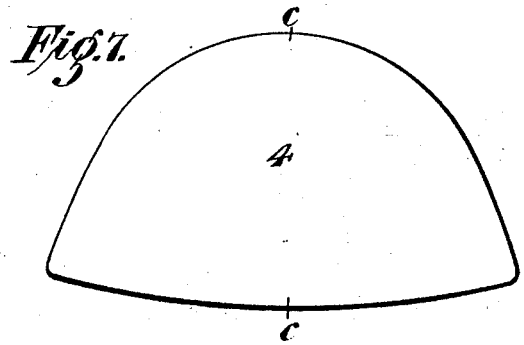
Fig.7.
Fig.9.
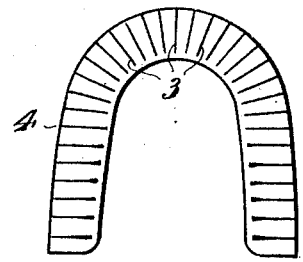
Fig.6.
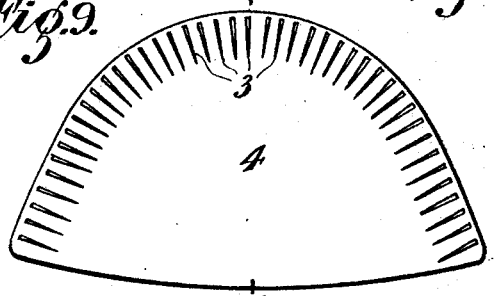
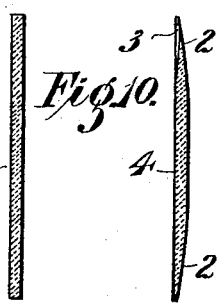
Fig.8. Fig.10.
F. C. Weichelt And P. S. Turnbull
INVENTORS
By: Marks & Clerk
Attys Jan. 1, 1929.                                                          1,697,548
F. C. WEICHELT ET AL
APPARATUS FOR USE IN MANUFACTURING LEATHER STIFFENERS
FOR THE HEELS AND TOES OF BOOTS AND SHOES
Filed Dec. 16, 1925         2 Sheets-Sheet 2

F. C. Weichelt and P.S.Turnbull
INVENTORS
By: Marks and Clerk
ATTYS

Patented Jan. 1, 1929.

1,697,548

UNITED STATES PATENT OFFICE.

FREDERICK CLAUDE WEICHELT AND PERCY SAMUEL TURNBULL, OF PRESTON, VICTORIA, AUSTRALIA, ASSIGNORS OF ONE-FOURTH TO PATTIE ELIZABETH WEICHELT, OF PRESTON, VICTORIA, AUSTRALIA, AND ONE-FOURTH TO ROBERT HOPPER WOODCOCK, OF DANDENONG, VICTORIA, AUSTRALIA.

APPARATUS FOR USE IN MANUFACTURING LEATHER STIFFENERS FOR THE HEELS AND TOES OF BOOTS AND SHOES.

Application filed December 16, 1925. Serial No. 75,842.

Leather stiffeners for the heels and toes of boots and shoes are at present manufactured from leather blanks, which, after being cut to the required shape and size, are dipped in water, and subsequently passed through a skiving machine to trim the lower marginal edge of said stiffeners, to form a bevel or feather edge. The object of damping the leather blank before skiving it is to facilitate the skiving operation and to maintain a sharp edge on the skiving knife. In order to utilize said stiffeners in the manufacture of boots and shoes, the operator has first to soak them in water for from ten minutes to half an hour, according to the hardness of the leather, in order to render them sufficiently pliable to enable him to fit and secure such stiffeners in position on the heel and toe respectively of a boot or shoe. This operation takes time, and is even then frequently unsatisfactory, owing to the difficulty of making said stiffeners fit snugly in position on the heel and toe of the boot or shoe. After the stiffeners have been fitted as aforesaid they must be allowed to dry before the making of the boot or shoe can proceed, thus entailing further loss of time.

The object of this invention is to provide an apparatus for carrying into effect an improvement in such stiffeners and which improvement forms the subject of an application for Letters Patent filed by us contemporaneously herewith. Stiffeners embodying that improvement only require their lower portion to be dipped in water for from ten seconds to not more than one minute, according to the hardness of the leather, instead of the whole being soaked in water for ten minutes to half an hour, as at present, before they can be utilized by the operator, and which, when removed by him from the water, can be easily and quickly applied to the heel and toe of a boot or shoe, and which, when applied, will fit snugly in position without difficulty, and dry quickly.

The said improvement in leather stiffeners of the type described for the heels and toes of boots and shoes consists of a series of equally-spaced incisions through the skin or outer surface of the stiffener at its lower marginal skived edge, said incisions extending from end to end of said skived portion, and inwards through said skived portion, at approximately right angles to the lower edge of said skived portion. In the case of stiffeners for the heels of boots and shoes, these incisions extend in a horizontal line from end to end of the lower marginal edge before referred to, while, in the case of stiffeners for the toes of boots and shoes, they extend approximately radially from end to end of the lower marginal edge before referred to. Stiffeners made according to that invention, only require their lower marginal edge, having the incisions therein, to be dipped in water by the operator for from ten seconds to not more than one minute, as before explained, the incisions permitting the water to percolate freely through the skived and feather edge portion of the stiffener, thereby rendering it perfectly pliable at that point. The operator then takes the stiffener, whether it is to be used for the heel or toe of a boot or shoe, and bends the incised portion at right angles, following which it can be readily bent to the necessary configuration, to constitute either a heel or toe stiffener, with the result that a perfect seating is formed for the foundation of the boot or shoe, the incisions before referred to assisting materially in effecting this result. It will be obvious that stiffeners embodying the improvement before described, can be made of much stouter material than is possible at present, thus rendering the boot or shoe to which they are applied more durable. As practically only the feather edge portion in which the incisions are made is wetted, the stiffener soon dries and little delay occurs in the manufacture of the boot or shoe.

The incisions in the stiffeners may be made in any approved manner, but we prefer to make them with the aid of the apparatus hereinafter described, and illustrated.

Referring to the drawings hereto attached:—

Fig. 1 is a view in plan of a leather blank usually employed for the manufacture of a stiffener for the heel portion of a boot or shoe.

Fig. 2 is a sectional view taken on lines a—a of Fig. 1.

Fig. 3 is a view in plan of the leather stiffener seen in Fig. 1, after the same has been skived, in the ordinary manner, and passed through the apparatus we have devised, to form the equally-spaced horizontally arranged incisions therein.

Fig. 4 is a sectional view taken on lines b—b of Fig. 3.

Fig. 5 is a sectional view illustrating the pliable portion of the stiffener, that is the incised portion thereof, bent at right angles to form the seating for the foundation of the boot or shoe.

Fig. 6 is a view in plan of the stiffener bent or shaped for fitting to the last about the heel or seat portion.

Fig. 7 is a view in plan of a leather blank to form a stiffener for the toe of a boot or shoe.

Fig. 8 is a sectional view taken on line c—c of Fig. 7.

Fig. 9 is a view in plan of the toe stiffener, showing the equally-spaced and approximately radially arranged incisions therein.

Fig. 10 is a sectional view taken on line d—d of Fig. 9.

Figure 11:
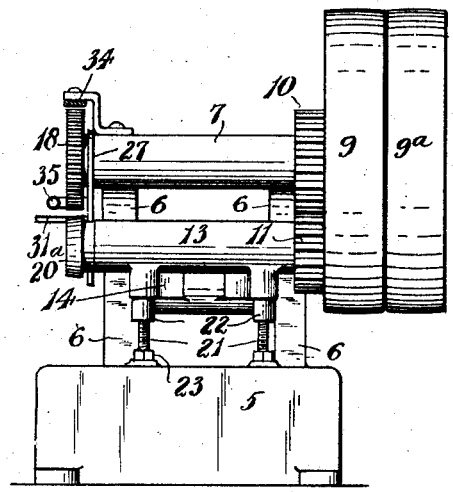
Fig. 11 is a view in side elevation of the apparatus we have invented, and prefer to use for making the incisions in the heel and toe stiffeners illustrated in Figs. 3 and 9 respectively.
Figure 13:
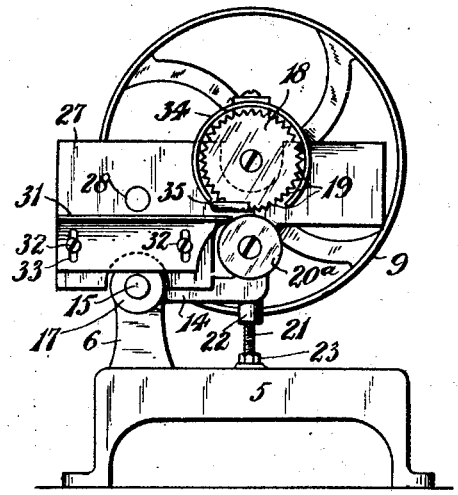
Fig. 13 is a view in front elevation of the apparatus, showing the arrangement of the feed plate and the cutting and feed rollers.
Figure 12:
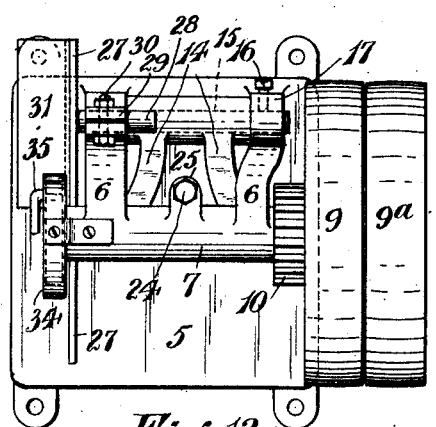
Fig. 12 is a view in plan of Fig. 11.
Figure 14:
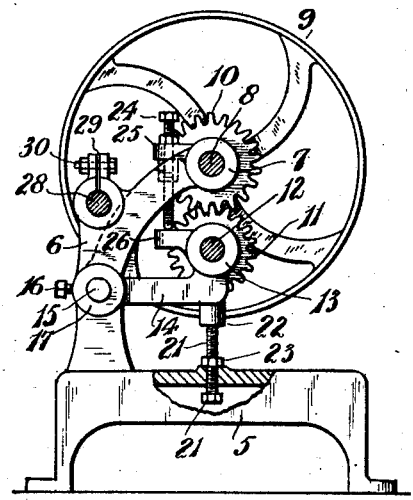
Fig. 14 is a sectional view illustrating the means employed for adjusting the position of the lower located feed roller.

Referring to Figs. 1 to 6, 1 is the leather blank, which, after being cut in the ordinary manner to the required shape and size to form a stiffener for the heel or toe of a boot or shoe, is subsequently passed, as at present, through a skiving machine in order to effectively trim the lower marginal edge of said blank to form a bevel or feather edge 2. For this purpose, as already explained, the leather blanks, as is customary, are dipped into wated, so as to facilitate the skiving operation and to maintain a sharp edge on the skiving blades or cutters. 3 are the series of equally spaced incisions in leather stiffeners for boots and shoes, and which incisions are formed in the blank 1 after it has been cut to the required shape and size. These incisions are preferably made with the aid of the apparatus illustrated in Figures 11 to 16, and extend through the skin or outer surface of the blank, and, as previously explained, extend inwardly from its lower marginal edge and at right angles thereto. Said lower edge portion, having the indentations 3, is dipped into water, which, by reason of the incisions 3 quickly percolates through the skived and feather edge portion, and renders the same pliable, following which, it can be readily bent to the configuration shown in Fig. 6, to enable it to be fitted about the heel of the last.

It will be understood that the manufacture of the stiffener 4 for the toe of a boot or shoe is carried out in the manner herein described, with reference to the manufacture of the heel stiffener 1, and therefore does not require further description.

The apparatus for forming the indentations or incisions 3 in the heel and toe stiffeners 1 and 4, comprises a cast metal base 5 on which is formed or secured a pair of integrally formed bracket members 6, on the upper ends of which is formed a comparatively long bearing boss 7 in which is revolubly mounted a main driving shaft 8. Fitted on the outer end of the main driving shaft 8 is a fast pulley 9 and loose pulleys 9$^a$ to receive a power transmission belt (not shown) from any suitable power source. A toothed wheel 10 fitted on the outer end portion of the main driving shaft 8 meshes with a similar wheel 11 that is keyed or otherwise fitted on the outer end portion of a lower located shaft 12 which is revolubly supported in an elongated boss 13 formed on the outer end of a bracket 14. This bracket is pivotally carried on a pin 15, rigidly secured by set-screw 16, in bosses 17 that are formed on the brackets 6. Detachably fitted on the forward end of the main shaft 8 is a cutting wheel 18 having V-shaped teeth 19 adapted to form the incisions 3 in the stiffeners 1 and 4 in the manner hereinafter described. The shaft 12 is located in vertical central alignment with the main shaft 8, and detachably fitted on the forward end of said shaft 12 is a feed roller 20 which is adapted to feed the stiffener blank under the cutting wheel 18 and also function as a presser roller. The width of the space between the cutting wheel 18 and the feed roller 20 requires adjusting to suit the varying thickness of the stiffeners that are being manufactured. For this purpose the gear wheels 10 and 11 have comparatively long teeth to provide for adjustment within certain limits. The width of the space between the cutting wheel 18 and the roller 20 is regulated by means of adjustment screws 21, which are screwed into the base portion 5 of the apparatus and adapted to bear against lugs 22 depending from the bracket 14, on which is formed the elongated boss 13 carrying the shaft 12. The adjustment screws 21 are fitted with lock nuts 23, adapted to be tightened against the base 5, so as to prevent accidental movement of said screws. To prevent any upward movement of the bracket 14 when the feed roller 20 has been set to the required position, an adjusting screw 24 is screwed through a lug 25 formed on the bearing boss 7 which revolubly supports the main shaft 8. This adjusting screw 24 is adapted to bear upon a lug 26 formed on the elongated boss 13 and thus prevent any accidental upward movement of the feed roller 20 during working operations. A guide plate 27 is fastened on the outer end of a short rod 28 which is adjustably fitted in a split lug 29 formed on one of the bracket members 6 and is rigidly held in position therein by a clamping bolt 30. This guide plate extends transversely across the apparatus and it passes behind the cutting wheel 18 and forms a limit stop for the stiffeners as they are being passed through said apparatus. A feed table 31 is adjustably fitted to the front of the guide plate 27 to support the leather stiffeners as they are being successively fed into the apparatus. This feed table is capable of vertical adjustment to suit the varying thickness of stiffeners required for the manufacture of different classes of foot-wear. For this purpose, the feed table 31 is secured in position to the guide plate 27 by screws 32 passing through slots 33 formed in said feed table. A curved plate 34 forming a safety guard is fitted to the apparatus to prevent an operator having his fingers injured whilst feeding the stiffeners between the rollers 18 and 20, while a pin 35 is also fitted to the guide plate 27 as a further means of preventing injury to the operator.

Figure 15:
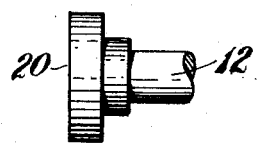
Fig. 15 is a view in side elevation of the feed roller employed to feed the heel stiffeners illustrated in Fig. 3 to the apparatus, in order that the necessary incisions may be made therein.
Figure 16:
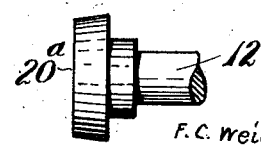
Fig. 16 is a view in side elevation of a feed roller having a bevel edge to make the necessary radial incisions in the toe stiffener illustrated in Fig. 9.

As seen in Fig. 15, a feed roller 20 having a plain surface, is employed for feeding the heel stiffeners 1 under the cutting roller 18; but, by reason of the toe stiffener having the indentations or incisions 3 formed approximately radial, it is necessary to provide a feed roller 20$^a$ having a bevelled surface as seen in Figs. 11 and 16.

In the operation of forming the indentations or incisions 3, in the heel stiffener 1, the roller 20 having a perfectly flat surface, is fitted on the end of the shaft 12. The stiffener 1 is placed on the feed table 31 with its straight edge in abutment with the guide plate 27. The stiffener is then pushed forward until it is gripped between the cutting roller 18 and the feed roller 20, when the rotary motion of said rollers will automatically carry the stiffener through the apparatus and cause the incisions 3 to be made through the skin or outer surface of the stiffener approximately at right angles to the lower marginal or straight edge of the same.

In forming the incisions about the lower or curved marginal edge of the toe stiffener, the bevel edge feed roller 20$^a$, (Fig. 16), is substituted for the roller 20, and the curved edge of the stiffener is maintained in contact with the guide plate by the operator, until the whole of the incisions 3 have been formed, and approximately radial, as illustrated in Fig. 10 of the drawings.

We claim:

In an apparatus for making incisions in stiffeners for boots and shoes, a main driving shaft, a counter shaft, a toothed wheel on one end of said shaft, said wheel meshing with a similar wheel on said counter shaft, a cutting wheel having V-shaped teeth detachably fitted on said main driving shaft, a feed roller detachably fitted on said counter shaft, said feed roller functioning also as a presser roller, means for imparting motion to said cutting wheel and feed roller, a guide plate disposed adjacent said cutting wheel, and a feed table secured to said guide plate and being capable of vertical adjustment.

FREDERICK CLAUDE WEICHELT.
PERCY SAMUEL TURNBULL.